Jan. 26, 1932.    M. S. DUNKELBERGER    1,842,591
ARTIFICIAL FISH BAIT
Filed July 1, 1929

INVENTOR
Milton S. Dunkelberger
BY Nonard S. Smith
His ATTORNEY

Patented Jan. 26, 1932

1,842,591

UNITED STATES PATENT OFFICE

MILTON S. DUNKELBERGER, OF DAYTON, OHIO

ARTIFICIAL FISH BAIT

Application filed July 1, 1929. Serial No. 374,992.

This invention relates to new and useful improvements in artificial fish-bait.

It is the principal object of my invention to provide an artificial fish-bait of the plug type whose head is formed with an inclined front face which is rotatively adjustable with respect to the body portion of the bait so as to cause the latter to float upon, or to dive under, the water, as desired.

Another object of my invention is to provide means for securely holding the head in an adjusted position with relation to the body portion of the bait.

It is another object of my invention to provide a draw shaft having a rear hook end to which a fish hook may be attached by forcing the shaft rearwardly against the tension of a spring which surrounds its front end.

It is another object of my invention to provide means for securing the middle fish hook to the draw shaft so that the hook cannot be pulled out.

Figure 1:
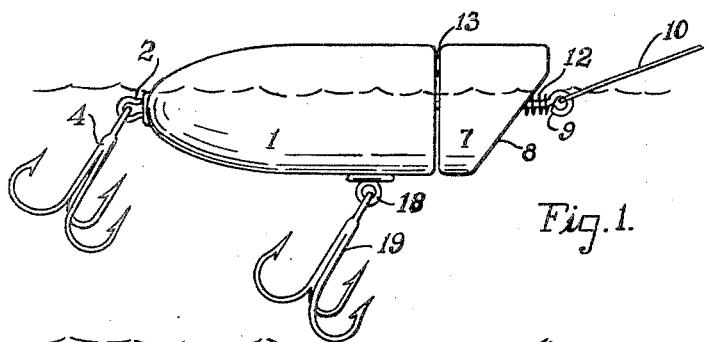
Figure 2:
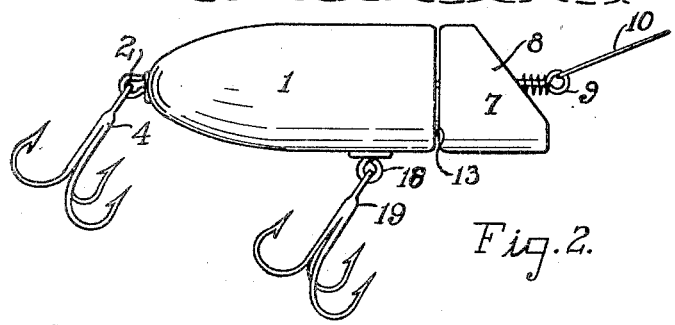
Figure 4:
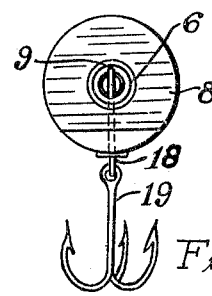
Figures 3, 5:
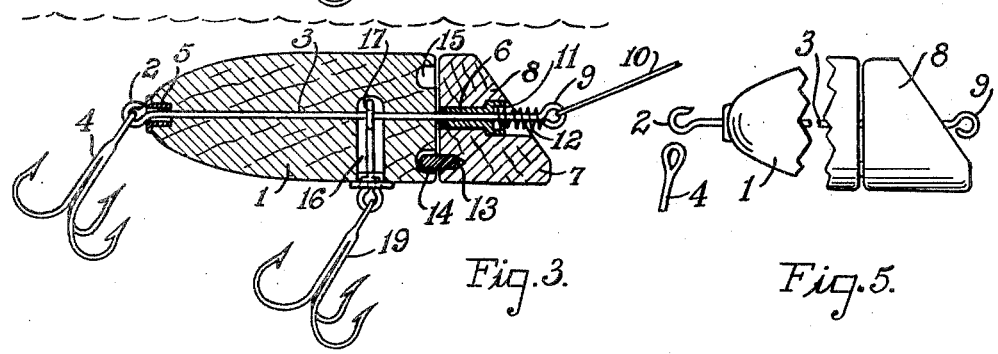

In the accompanying drawings illustrating my invention, Figure 1 is a side view of my artificial fish-bait with its head adjusted to cause the device to float upon the surface of the water. Figure 2 is a side view of the device when its head is in a position to cause it to travel under the water. Figure 3 is a longitudinal section taken through the device, showing how the head is pivotally secured to the body portion of the bait. Figure 4 is a front view of the latter. And Figure 5 is a side view of the device, showing the rear end of the draw shaft pulled out to receive the rear fish hook.

Referring to the accompanying drawings for a detailed description of my invention, the numeral 1 designates a substantially conical-shaped float made of wood or other light material. Secured to the rear hook end 2 of a draw shaft 3 longitudinally movable through an axial hole in the float 1, is a fish hook 4. This shaft is received at its rear end by a flanged bushing 5 in the back end of the float 1, and at its front end by a sleeve 6. This sleeve is inserted in an axial hole in a cylindrical head 7 having a deflecting face 8 which is at an acute angle to its rear face. The sleeve and head are free to turn around the draw shaft 3 that terminates at its front end in an eye 9 to which a line 10 is attached.

The sleeve 6 terminates at its front end in a cup portion 11 to receive the rear end of a coil spring 12 that surrounds the draw shaft between its eye end 9 and the cup end of the sleeve. This spring is under sufficient tension to hold a pin 13 on the rear face of the head 8, within one of two holes 14 and 15 in the front face of the float 1. These holes are so placed that when the pin is in the hole 14, the head will have the position shown in Figures 2 and 3, so that when the bait is drawn through the water by the line 10, it will dive. If the head is pulled out against the pressure of the spring 12 and turned to bring the pin 13 into the hole 15, then the deflecting face 8 of the head will be at an obtuse angle to the surface of the water and the bait will float when drawn forwardly by the line. Weeds and other subterranean growths are at times so near the surface of the water as to make it desirable that the artificial bait float over them.

Within a radial hole 16 in the lower middle portion of the float 1, is the inner eye end 17 of an eye piece 18 to whose outer eye end a fish hook 19 is secured. The draw shaft 3 passes through the inner eye end of the eye piece 18 to firmly secure it to the float. When it is screwed into the wood alone, it is frequently pulled out by the hook.

To apply the rear hook 4 to the draw shaft 3, it is only necessary to pull its hook end 2 outwardly against the tension of the spring 12, whereupon the eye end of the hook 4 may be easily shipped over the hook end of the shaft.

It is thus seen that I have provided an artificial fish-bait which, when drawn through the water, will float or dive dependent upon the position in which the pivoted head 7 is set. The hooks, being secured to the draw shaft, will not pull out, while the head may be turned around the shaft to either one of its two adjusted positions, where it will be securely held by the locking pin.

Having described my invention, I claim:

An artificial fish-bait comprising an elongated float body formed with an axial hole, a draw shaft longitudinally movable in said hole, a head pivotally secured to the front end of the draw shaft and formed with a recess in its front portion, a sleeve formed with a cupped end in said recess, a hook on the rear end of the draw shaft, said draw shaft formed on its front end with an eye portion, and a coil spring applied to the draw shaft between its eye portion and the cupped end of the sleeve in said head for the purpose specified.

In testimony whereof I have hereunto set my hand this 27th day of June, 1929.

MILTON S. DUNKELBERGER.